(12) United States Patent
Langlais et al.

(10) Patent No.: US 12,415,570 B2
(45) Date of Patent: Sep. 16, 2025

(54) ROOF MODULE FOR FORMING A VEHICLE ROOF COMPRISING AN ADJUSTABLE CLEANING NOZZLE

(71) Applicant: Webasto SE, Stockdorf (DE)

(72) Inventors: Cédric Langlais, Stockdorf (DE); Nikolaus Linner, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 627 days.

(21) Appl. No.: 17/846,704

(22) Filed: Jun. 22, 2022

(65) Prior Publication Data

US 2023/0008767 A1    Jan. 12, 2023

(30) Foreign Application Priority Data

Jul. 8, 2021    (DE) .................. 10 2021 117 705.7

(51) Int. Cl.
*B62D 25/06*    (2006.01)
*B60S 1/52*    (2006.01)
*B60S 1/54*    (2006.01)

(52) U.S. Cl.
CPC ............. *B62D 25/06* (2013.01); *B60S 1/52* (2013.01); *B60S 1/54* (2013.01)

(58) Field of Classification Search
CPC . B60S 1/52; B60S 1/54; B60S 1/0822; B62D 25/06
See application file for complete search history.

(56) References Cited

U.S. PATENT DOCUMENTS

| | | | | |
|---|---|---|---|---|
| 5,269,464 A | * | 12/1993 | Epple | B60S 1/528 239/588 |
| 2003/0066909 A1 | * | 4/2003 | Jenkins | B60S 1/528 15/250.002 |
| 2006/0048453 A1 | | 3/2006 | Bourennane | |

(Continued)

FOREIGN PATENT DOCUMENTS

| | | |
|---|---|---|
| CN | 112550227 A | 3/2021 |
| CN | 112550228 A | 3/2021 |

(Continued)

OTHER PUBLICATIONS

KR 200472769 Translation (Year: 2014).*

(Continued)

*Primary Examiner* — Steven M Cernoch
(74) *Attorney, Agent, or Firm* — Fitch, Even, Tabin & Flannery, LLP

(57)    ABSTRACT

A roof module for a motor vehicle roof having a panel component whose outer surface at least partially forms the roof skin of the vehicle roof and serves as an outer sealing surface of the roof module, at least one environment sensor configured to send and/or receive electromagnetic signals through a see-through area for detecting a vehicle environment around an optical axis of the environment sensor, and at least one cleaning nozzle configured to clean the see-through area. Viewed in the direction in which the optical axis of the environment sensor points, the at least one cleaning nozzle is disposed in such a manner in an area of the panel component in front of the see-through area that the at least one cleaning nozzle can be adjusted between a retracted position and a deployed position by means of at least one drive kinematics unit.

13 Claims, 4 Drawing Sheets

(56) References Cited

U.S. PATENT DOCUMENTS

| | | |
|---|---|---|
| 2020/0023815 A1 | 1/2020 | Galera et al. |
| 2020/0180563 A1 | 6/2020 | Gilbertson |
| 2020/0290572 A1 | 9/2020 | Rachow |
| 2021/0086727 A1 | 3/2021 | Bopp |
| 2021/0088668 A1 | 3/2021 | Hahn |
| 2021/0387597 A1* | 12/2021 | Trebouet ................ B08B 13/00 |

FOREIGN PATENT DOCUMENTS

| | | | |
|---|---|---|---|
| CN | 112770946 A | 5/2021 | |
| DE | 4130892 A1 | 3/1992 | |
| DE | 19847473 A1 | 10/1998 | |
| DE | 19740828 A1 | 3/1999 | |
| DE | 10015077 A1 | 10/2001 | |
| DE | 10316473 A1 | 12/2004 | |
| DE | 102004054229 A1 | 5/2006 | |
| DE | 60116294 T2 | 7/2006 | |
| DE | 60200500254 T2 | 6/2008 | |
| DE | 102007007850 A1 | 8/2008 | |
| DE | 102014015914 A1 | 10/2015 | |
| DE | 102018103125 U1 | 8/2018 | |
| DE | 102018215915 A1 | 3/2019 | |
| FR | 2682658 A1 | 4/1993 | |
| KR | 200472769 Y1 * | 5/2014 | ............... B05B 1/10 |
| WO | 20200064885 A1 | 4/2020 | |

OTHER PUBLICATIONS

Office Action issued in corresponding Chinese Application No. 202210805494.5; mailed Jan. 26, 2025; In Chinese with English machine translation (16 pages).

* cited by examiner (a)

(b)

(a)

(b)

ROOF MODULE FOR FORMING A VEHICLE ROOF COMPRISING AN ADJUSTABLE CLEANING NOZZLE

CROSS-REFERENCE TO RELATED APPLICATION

This application claims priority from German Patent Application Number DE 10 2021 117 705.7, filed Jul. 8, 2021, which is hereby incorporated herein by reference in its entirety for all purposes.

FIELD

The invention relates to a roof module for forming a vehicle roof on a motor vehicle according to the preamble of claim 1.

BACKGROUND

Generic roof modules are widely used in vehicle manufacturing since these roof modules can be prefabricated as separate functional modules and can be delivered to the assembly line when assembling the vehicle. At its outer surface, the roof module at least partially forms a roof skin of the vehicle roof, which prevents humidity and air flows from entering the vehicle interior. The roof skin is formed by one or more panel components, which can be made of a stable material, such as painted metal or painted or died-through plastic. The roof module can be a part of a fixed vehicle roof or a part of an openable roof subassembly.

Furthermore, the development in vehicle manufacturing is increasingly focusing on autonomously and semi-autonomously driving motor vehicles. In order to enable the vehicle controller to control the motor vehicle autonomously or semi-autonomously, a plurality of von environment sensors (e.g., lidar sensors, radar sensors, (multi-)cameras, etc. including other (electrical) components) are employed, which are integrated in the roof module, for example, and which detect the environment surrounding the motor vehicle and determine, for example, a current traffic situation from the detected environment data. Roof modules which are equipped with a plurality of environment sensors are also known as roof sensor modules (RSM). For this purpose, the known environment sensors send and/or receive suitable electromagnetic signals, such as laser beams or radar beams, allowing a data model of the vehicle environment to be generated by suitable signal evaluation and to be used for controlling the vehicle.

The environment sensors for monitoring and detecting the vehicle environment are typically mounted on the vehicle roof since the vehicle roof is typically the highest point of a vehicle, from where the vehicle environment is easily visible. The environment sensors are typically placed on top of the panel component of the roof module, which forms the roof skin, as attachments; alternatively, they can also be disposed and adjustable between a retracted position and a deployed position in an opening of the roof module.

During the use of the environment sensor, ambient conditions (e.g., weather) pose the risk that a ((partially) transparent) see-through area, through which the environment sensor detects the vehicle environment, becomes dirty, i.e., opaque to the environment sensor, because of environmental and weather conditions. For cleaning the see-through area, the use of cleaning nozzles by means of which the see-through area can be cleaned is known. Similar to spray nozzles of a windshield wiper system, the known cleaning nozzles are typically disposed statically in an area of the roof module or the panel component that is located in front of the environment sensor when viewed in the direction of an optical axis of the environment sensor. Thus, the cleaning nozzles are disposed in a field of view of the environment sensor and typically protrude over the roof skin.

However, this placement of the cleaning nozzles is disadvantageous for various reasons. For one, the cleaning nozzles protruding from the roof skin often do not meet the aesthetic demands on a vehicle design and may appear aesthetically disadvantageous to a customer, for example. For another, the placement of the cleaning nozzles in front of the environment sensor means that that they are at least located in its field of view. In this field of view, however, the prominences due to the cleaning nozzles cause blind areas, in which the environment sensor cannot detect the vehicle environment with sufficient precision, by shading the field of view. Since these blind areas become larger with increasing distance from the environment sensor because of trigonometrical-optical relationships, "blind angle areas" in the field of view can arise for the environment sensor, which is to be avoided. Also, the known placement of the cleaning nozzle may lead to an aerodynamically disadvantageous noise behavior, which is produced by turbulent flows forming around the prominence of the cleaning nozzles and which a passenger in an interior of the vehicle may find disturbing. When placed in the know manner, the cleaning nozzles spray a cleaning fluid at least in the direction of the headwind (i.e., in a direction opposite to the driving direction) and their spraying, and thus cleaning, effect is negatively affected by the occurring headwind in this position (in particular at higher driving speeds). The headwind reduces the cleaning efficiency since at least part of the cleaning fluid is blown away by the wind and can no longer strike the see-through area.

In automotive engineering, retractable and deployable cleaning nozzles for vehicle lights and/or a windshield which are embedded in a vehicle body of the vehicle in front of the area to be cleaned relative to the line of vision are one approach to solving this problem. These cleaning nozzles are moved by means of a hydraulic drive, i.e., by means of a water pressure inherent to the cleaning nozzle. However, this system has disadvantages, as well, since each cleaning nozzle requires its own water pressure-based drive, for example, for which additional installation space is needed. Furthermore, these hydraulic systems can be moved along one predetermined direction only, namely a hydraulic path of the cleaning nozzle, which limits both a constructive scope and a freedom of design in placing the cleaning nozzles. Likewise, an initiation of the movement can be delayed by a latency, which is defined by the time it takes to build up pressure inside the hydraulic drive system and which can be several seconds. Overall, these known drives for moving the cleaning nozzles have several disadvantages, which are to be overcome as well.

SUMMARY

Hence, an object of the invention is to propose a roof module which avoids the disadvantages of the known state of the art described above.

This object is attained by a roof module according to the teaching of claim 1.

Advantageous embodiments of the invention are the subject matter of the dependent claims.

The roof module according to the invention for forming a vehicle roof on a motor vehicle comprises a panel component whose outer surface at least partially forms the roof skin of the vehicle roof and serves as an outer sealing surface of the roof module. The roof module comprises at least one environment sensor which can send and/or receive electromagnetic signals through a see-through area for detecting a vehicle environment around an optical axis of the environment sensor. Furthermore, the roof module comprises at least one cleaning nozzle by means of which the see-through area can be cleaned. The roof module according to the invention is characterized in that, viewed in the direction in which the optical axis of the environment sensor points, the at least one cleaning nozzle is disposed in such a manner in an area of the panel component located in front of the see-through area that the at least one cleaning nozzle can be moved between a retracted position and a deployed position by means of at least one drive kinematics unit.

The configuration of the roof module according to the invention, more precisely the movability of the at least one cleaning nozzle between the retracted position and the deployed position, has the advantage that no cleaning nozzles are disposed in a field of view of the environment sensor. Thus, the at least one cleaning nozzle does not produce a "blind angle area" in which the environment sensor cannot detect the vehicle environment because it is being shaded by the cleaning nozzles. Instead, it is possible for the environment sensor to perceive the vehicle environment undisturbed in its entire detection range. This increases the reliability and the precision of detection of the environment sensor.

So the roof module according to the invention preferably does not employ a water pressure-based adjustment drive for adjusting the cleaning nozzle(s) but a drive kinematics unit which does not work with water pressure but preferably in another mechanical, electrical or, for example, oil-hydraulic manner. Consequently, the cleaning nozzle's capability of being retracted and deployed is no longer coupled to a system pressure of the cleaning nozzle, which means that the pressure level of the at least one cleaning nozzle (or of the cleaning circuit) can be reduced compared to a water pressure-based drive as employed in the state of the art. Thus, smaller pumps (having a lower pressure level) can be used, for example, which saves installation space and the amount energy needed. Likewise, the use of the preferably mechanical or electrical adjustment drive allows the at least one cleaning nozzle to be retracted and/or deployed with less latency compared to a water pressure-based drive since there is no delay due to a pressure build-up in the case of an electrical drive, for example; instead, the adjustment energy can be provided immediately (i.e., within few milliseconds, for example). So the drive kinematics unit is independent from a fluid circuit of a cleaning fluid, which means that faster retraction and/or deployment can be ensured. The use of the at least one drive kinematics unit enables a high degree of freedom of design in constructing and dimensioning the roof module since the drive kinematics unit can be placed very flexibly within the roof module as opposed to a hydraulic drive and there is no constructive dependency on a flow direction along a hydraulic path. Thus, a very flexible use of the available installation space is possible.

Also, the at least one cleaning nozzle's placement according to the invention is advantageous from an aesthetic point of view since no undesired protrusions are formed on the roof skin. Instead, the at least one cleaning nozzle is preferably retracted entirely into an opening of the panel component, i.e. flush with the outer surface of the roof skin, when it is in the retracted position and disappears from the outer appearance of the roof module when in the retracted position. Moreover, the at least one cleaning nozzle's placement according to the invention has the advantage that the at least one cleaning nozzle does not cause any disturbing aerodynamic factors. Thus, there is preferably low noise emission in a passenger compartment of a vehicle. Also, the at least one cleaning nozzle according to the invention can ensure a more efficient cleaning of the see-through area because of aerodynamic design aspects, which is to be discussed in more detail below.

"At least one environment sensor" means that the roof module can comprise one or more environment sensors. "At least one cleaning nozzle" means that the roof module can comprise one or more cleaning nozzles. "At least one drive kinematics unit" means that the roof module can comprise one or more drive kinematics units. So it is possible that multiple drive kinematic units are employed if multiple cleaning nozzles are present. For instance, one drive kinematics unit can be used for a single cleaning nozzle or for more than one cleaning nozzle, for example. This essentially depends on the respective application and design. The field of view of the environment sensor preferably extends symmetrically around the optical axis of the environment sensor in the shape of a cone having a sensor-specific cone opening angle.

Preferably, the roof module comprises at least two cleaning nozzles, which are disposed in the same opening while being spaced apart from each other or in two separate openings in the panel component of the roof module and movable therein. For the purpose of cleaning, the roof module can further have one or more hose lines and/or a tank for cleaning fluid. Alternatively, it is also possible for a tank present in the vehicle for cleaning fluid for cleaning the front and rear windows to be used as a reservoir for the cleaning fluid. The deployed position does not necessarily have to be a fully deployed position. For instance, it may be possible for the at least one cleaning nozzle to be merely moved into a not fully deployed position if only a portion of the see-through area is to be cleaned (e.g., if only part of it is dirty), for example.

The roof module according to the invention can form a structural unit in which features for autonomous or semi-autonomous driving assisted by driver assistance systems are integrated and which can be placed on top of a vehicle body shell as a unit by the vehicle manufacturer. Furthermore, the roof module according to the invention can be a purely fixed roof or a roof including a roof opening system. Moreover, the roof module can be configured for use in a passenger car or in a utility vehicle. The roof module can preferably be provided as a structural unit in the form of a roof sensor module (RSM) in which the environment sensors are provided so as to be inserted into a roof frame of a vehicle body as a suppliable structural unit.

The environment sensor of the roof module according to the invention can basically be configured in various ways and can in particular comprise a lidar sensor, a radar sensor, an optical sensor, such as a camera, and/or the like. For example, lidar sensors operate in a wavelength range of 905 nm or approximately 1550 nm. The material of the roof skin in a see-through area should be transparent to the wavelength range used by the environment sensor and should therefore be selected as a function of the wavelength(s) used by the environment sensor.

In a particularly preferred embodiment, the at least one cleaning nozzle is disposed in at least one housing which comprises at least one lid part. So the at least one cleaning nozzle is preferably disposed in a separate housing. The at least one housing is preferably mounted on a frame structure of the roof module and movable thereon. If multiple cleaning nozzles are used, they can be disposed in a single housing while being spaced apart from each other, for example, or in respective separate housings (e.g., corresponding to the number of cleaning nozzles). The housing can be made of a metallic material or plastic and can at least partially enclose the at least one cleaning nozzle. The housing has a portion which forms the lid part of the housing. The lid part can be installed on the housing as a separate attachment or can alternatively be integrally connected thereto.

In a preferred embodiment, the at least one lid part is flush with the outer surface of the roof skin of the vehicle roof, i.e., without there being a protrusion, when the at least one cleaning nozzle is in the in the retracted position. In the deployed position, the at least one cleaning nozzle preferably at least partially protrudes over the outer surface of the roof skin of the vehicle roof so that a cleaning fluid can exit the cleaning nozzle and can be sprayed onto the see-through area from outside. It is preferred for the at least one cleaning nozzle to be oriented in such a manner in the deployed position that the fluid cone strikes the see-through area at an oblique angle. This embodiment is particularly preferred if two cleaning nozzles are employed which are disposed on either side next to the environment sensor (i.e., to the right and to the left of the environment sensor in the direction in which the optical axis points), for example. In this case, each of the cleaning nozzles or at least a nozzle head of the cleaning nozzles can be positioned obliquely relative to the optical axis of the environment sensor, for example, with the result that the two fluid cones which can be formed by means of the cleaning nozzle at least partially overlap. This allows the cleaning effect to be increased at least in the area of overlap, which preferably covers almost the entire see-through area depending on the cone opening angle.

In a preferred embodiment, the at least one lid part can close at least one opening in the panel component, in which the at least one cleaning nozzle is disposed and moveable between the retracted position and the deployed position, in an essentially precisely fitting manner. In other words, the at least one cleaning nozzle preferably comprises the cover, i.e., the lid part, which is disposed on the at least one housing in an essentially precisely fitting manner and which can close the opening in the roof skin in the retracted state. The cover preferably has essentially the same shape as (i.e., has only tolerance-related size differences to) the opening in the panel component. The cover can prevent the at least one cleaning nozzle from being blocked or damaged by flying particles or the like, for example. A cover of this shape can thus close the housing opening precisely and in an exactly fitting manner when the cleaning nozzle is retracted. Furthermore, the lid part can have an aerodynamically optimized shape.

In a preferred embodiment, the at least one housing comprises at least one opening through which the at least one cleaning nozzle can spray a fluid cone produced when cleaning the see-through area onto the see-through area from outside, preferably in a direction opposite to the driving direction. So the housing does not enclose the at least one cleaning nozzle entirely; instead, it has at least one opening through which a spraying head of the cleaning nozzle protrudes, for example, so that the cleaning fluid can exit unhindered.

In a preferred embodiment, the at least one cleaning nozzle is disposed to the left and/or to the right of the environment sensor when viewed along an optical axis of the environment sensor. In this embodiment, two cleaning nozzles are present, which are disposed in the panel component of the roof module at a distance from each other on either side of the environment sensor, preferably symmetrically to the optical axis of the environment sensor. In this configuration, it is possible for an ideal area of overlap of the fluid cones to be established since the fluid nozzles can be directed at the see-through area, preferably mirror-symmetrically, from both sides. Furthermore, if the see-through area is large, it is possible for half of a surface of the see-through area to be cleaned by means of one of the two cleaning nozzles and for the other half of the surface of the see-through area to be cleaned by means of the other one of the two cleaning nozzles.

In a preferred embodiment, at least one cleaning nozzle is disposed below the see-through area (viewed in a direction toward the roof skin) of the environment sensor in the housing. So the cleaning nozzles are preferably disposed below an installation height of the environment sensor when viewed in the vertical direction. Alternatively, however, it is also conceivable for the at least one cleaning nozzle to be disposed at a height of the environment sensor or at an installation height at which the optical axis of the environment sensor runs, or above the latter. So the cleaning nozzles are preferably disposed on either side next to the environment sensor depending on the installation space and the configuration of the housing of the environment sensor.

In a preferred embodiment, at least part of the at least one housing serves as a headwind spoiler, by means of which headwind can be deflected away from the see-through area, when the at least one cleaning nozzle is in the deployed state. In other words, the at least one housing of the at least one cleaning nozzle is swung out, i.e., deployed, and at least partially forms a spoiler deflecting the headwind during cleaning. Thus, the spray field or the spray cone of the at least one spray nozzle is affected less by the headwind but also by an ambient wind which may prevail. The headwind and/or the ambient wind is instead deflected by the spoiler with the result that it no longer directly strikes the see-through area and is instead lead past to the sides of and above the see-through area. Thus, the wind affects the spray cone less strongly with the result that an improved cleaning effect can be achieved. To this end, the housing, e.g., the lid part and/or side walls of the housing, can be shaped aerodynamically and can have one or more curvatures, channels, air guiding slits, and/or other shaping elements, for example. The aerodynamic shape of the housing can be provided by one or more components which can be installed on the housing. Alternatively, the aerodynamic shape can also be provided by the integral design of the housing.

In a preferred embodiment, the at least one drive kinematics unit comprises a drive which is configured to move the at least one cleaning nozzle from the retracted position into the deployed position at least along an axis of movement and/or at least about an axis of rotation. So the housing can be moved by means of the drive kinematics unit. Depending on the design of the kinematics, the housing moves translationally along one or more movement axes, for example. Alternatively or additionally, it is possible for the housing to be turned or rotated about one or more axes of rotation during the retracting and/or deploying movement. The exact motion sequence essentially depends on where the drive kinematics unit is placed relative to the housing of the cleaning nozzle and which type and size of installation space is available for the at least one cleaning nozzle and the drive kinematics unit.

In a preferred embodiment, the drive comprises an electric motor, a Bowden cable, and/or oil hydraulics. Other types of drives, which are not explicitly mentioned here, are conceivable as well. For example, a (electrically operated) linear drive can also be used for moving the at least one cleaning nozzle from the retracted position into the deployed position. The Bowden cable is preferably a movable machine element for transmitting a mechanical movement and pressure and pulling forces by means of a flexible combination of a wire cable and a sleeve which is compression-proof in the direction of its length. The oil hydraulics can be one or more hydraulic components which operate by means of a predetermined oil pressure, for example. Oil hydraulics have the advantage that any pressure level can be selected and a latency for the pressure build-up for initiating the movement can thus be kept low.

In a preferred embodiment, the drive can be moved along a drive axis and/or about the drive axis. The drive axis is preferably oriented in a direction other than that of the axis of movement and/or the axis of rotation. So the drive is not limited to a certain direction, as it would be in the case of a water pressure-based movement of the cleaning nozzle; instead, it can be preferably selected freely. Thus, the drive kinematics unit can induce the retracting and/or deploying movement in another direction (e.g., translationally along the drive axis and/or rotationally about the axis of rotation) than the direction in which the actual retracting and/or deploying movement of the cleaning nozzle takes place. This makes it possible, for example, for the drive kinematics unit to be placed laterally next to the cleaning nozzle (viewed in the direction in which the line of vision of the optical axis of the environment sensor points), while the cleaning nozzle is deployed in a vertical direction (away from a bottom of the vehicle). By decoupling the direction of movement, the degree of freedom of design is increased with the result that an available installation space can be ideally utilized. For deflecting directions of movement, the drive kinematics unit can comprise a transmission having a gearwheel drive, for example. Other types of deflections (e.g., a cable with pulleys or the like) are conceivable as well.

In a preferred embodiment, the drive kinematics unit comprises at least one spring by means of which the at least one cleaning nozzle can be returned from deployed position into the retracted position by means of a restoring force of the at least one spring. So the at least one cleaning nozzle is preferably not returned from the deployed position into the retracted position by means of the drive kinematics unit. Instead, one or more springs are preloaded by means of the drive during deployment with the result that the at least one cleaning nozzle can be moved back into the retracted position by means of the preloaded spring after cleaning without having to operate the drive again. Selecting the spring constant(s) makes it possible to determine a retraction time, the retraction time being shortened with an increasing spring stiffness.

In a preferred embodiment, the drive kinematics unit comprises at least one lever element which is preferably supported on a frame structure of the roof module by means of a fixed bearing and by means of which a movement of the drive can be directly or indirectly transmitted to the at least one cleaning nozzle. Alternatively or additionally (i.e., and/or), the at least one lever element is connected to the drive of the at least one cleaning nozzle in a force-transmitting manner by means of a floating bearing. For example, the force needed to retract and/or deploy the at least one cleaning nozzle can also be transmitted from the drive to the cleaning nozzle via one or more lever elements. Such a lever element can serve as a mere link between the drive and the cleaning nozzle or actually participate kinematically in the motion sequence (e.g., by deflection of direction) of the retracting and/or deploying movement, for example. The lever element can also be disposed on the housing as a kind of suspension in order to rotate the latter about an axis of rotation, in which case the lever element is connected to the drive indirectly only.

Basically any type of environment sensor can be installed in the roof module. The use of lidar sensors and/or radar sensors and/or camera sensors and/or multi-camera sensors is particularly advantageous.

Naturally, the embodiments and illustrative configurations mentioned above and yet to be discussed can be realized not only individually but also in any combination with each other without departing from the scope of the present invention. Moreover, any and all embodiments and illustrative configurations of the roof module relate to a motor vehicle having such a roof module.

BRIEF DESCRIPTIONS OF THE DRAWINGS

An embodiment of the invention is schematically illustrated in the drawing and will be explained as an example below.

DETAILED DESCRIPTION

Figure 1:
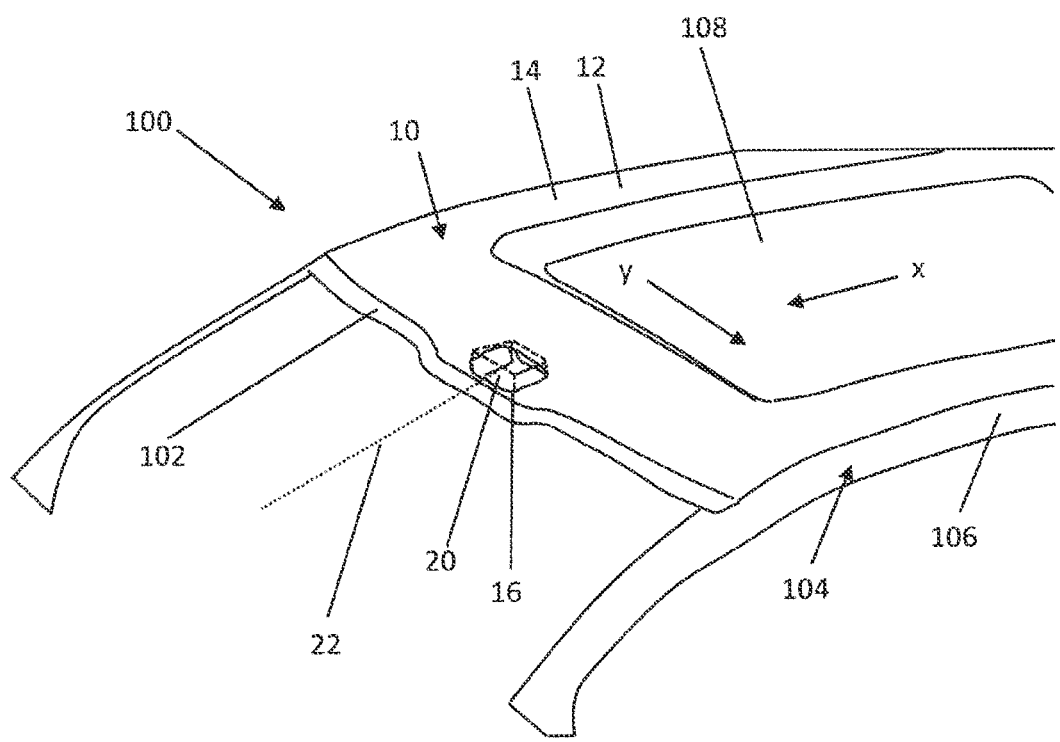
FIG. 1 is a perspective view of a vehicle roof having a roof module according to the invention.

FIG. 1 shows a vehicle roof 100 of a vehicle (not shown in full) comprising a roof module 10. Roof module 10 is preferably inserted into a roof frame 104 of the vehicle, i.e., placed on top of the at least two transverse beams 102 and the at least two longitudinal beams 106 which form roof frame 104, as a structural unit. Roof module 10 in the illustrative configuration shown has a panoramic roof 108.

Roof module 10 comprises a panel component 12 for forming a roof skin 14 of vehicle roof 100. An environment sensor 16 is disposed symmetrically with respect to the longitudinal vehicle axis in a front area of vehicle roof 100 or roof module 10 (viewed in a longitudinal vehicle direction x). Environment sensor 16 is disposed directly behind a front transverse beam 102, which defines a header at the roof of the vehicle. Environment sensor 16 is disposed in a sensor housing 18, by means of which environment sensor 16 is disposed (or mounted) on a frame structure 110 in such a manner that it can be retracted and deployed in an opening (not shown) in roof skin 14 of roof module 10. Alternatively, environment sensor 16 can also be installed on an outer surface of roof skin 14 or on panel component 12 with sensor housing 18. Environment sensor 16 is disposed in an interior of sensor housings 18. Sensor housing 18 forms a dry area in which environment sensor 16 is disposed and sealed from humidity. In the case at hand, environment sensor 16 is a lidar sensor. However, other sensor types, such as (multidirectional) cameras which are used in (semi-) autonomous driving, can be employed as well.

Environment sensor 16, i.e., sensor housing 18 of environment sensor 16, comprises a see-through area 20, which can be made of a preferably shatter-proof plastic or another (semi-)transparent material, for example. Environment sensor 16 is oriented along an optical axis 22, which is oriented parallel to longitudinal vehicle direction x in the case of FIG. 1.

Roof module 10 further comprises at least one cleaning nozzle 24, by means of which see-through area 20 can be cleaned. In the case at hand, roof module 10 is provided with two cleaning nozzles 24 (see FIGS. 2(*a*), (*b*) and 3(*a*), (*b*)), which are each supplied with a cleaning fluid (such as a liquid or a gas) via a supply channel (not shown). Cleaning nozzles 24 are preferably oriented at an angle relative to each other when in a cleaning position so that see-through area 20 can be cleaned from two different directions. The cleaning fluid can be soapy water, for example. Alternatively, a cleaning using pressurized air or another pressurized gas is conceivable as well. When the cleaning fluid exits cleaning nozzles 24, respective fluid cones 26 are produced, which strike see-through area 20 and clean it (see FIG. 5). Fluid cones 26 can preferably at least partially overlap in an area of overlap (not shown) of see-through area 20.

In the case at hand, cleaning nozzles 24 are disposed in at least one housing 28. In the configuration shown in FIGS. 2 and 3, the two cleaning nozzles 24 are disposed in a shared housing 28. Alternatively, it is also possible for each of the (at present two) cleaning nozzles 24 to be disposed in a separate housing 28. Housing 28 is mounted or supported on frame structure 110 in a movable manner so that cleaning nozzles 24 can be moved between a retracted position (see FIGS. 2 and 4) and a deployed position (se FIGS. 3 and 5). According to FIGS. 2 and 3, cleaning nozzles 24 can be moved translationally between the retracted position (see FIG. 2) and the deployed position (see FIG. 3) along an axis of movement 30. In an alternative embodiment according to FIGS. 4 and 5, cleaning nozzles 24 can be moved rotationally between the retracted position (see FIG. 4) and the deployed position (see FIG. 5) about an axis of rotation 32.

Figure 2:
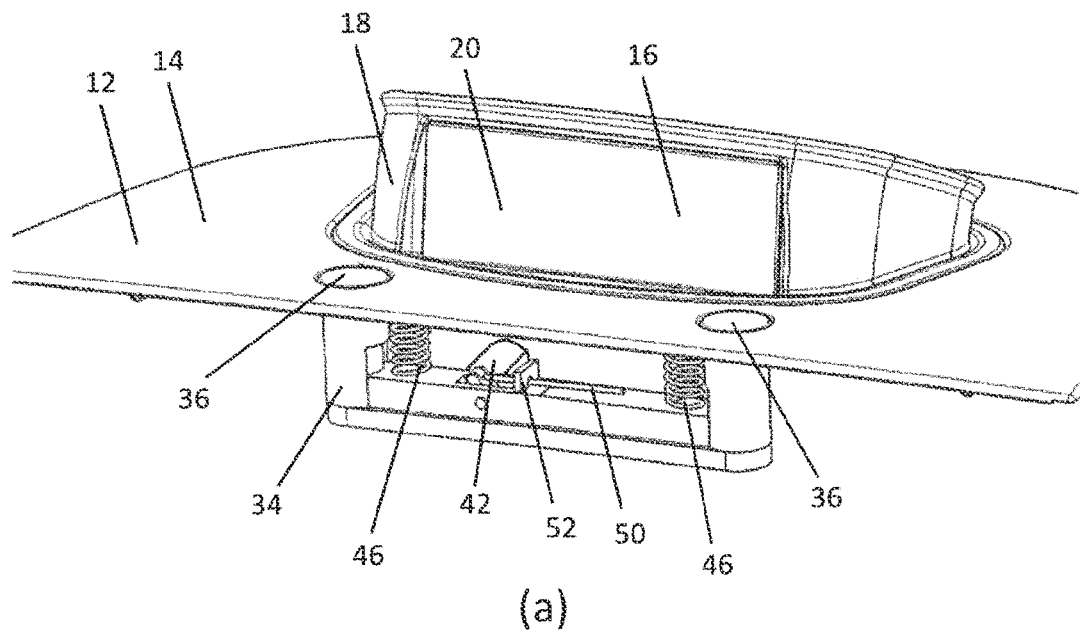
FIG. 2 shows an illustrative configuration of the roof module according to the invention in a schematic view (a) and in a sectional view (b) with the cleaning nozzles in a retracted position.
Figure 2:
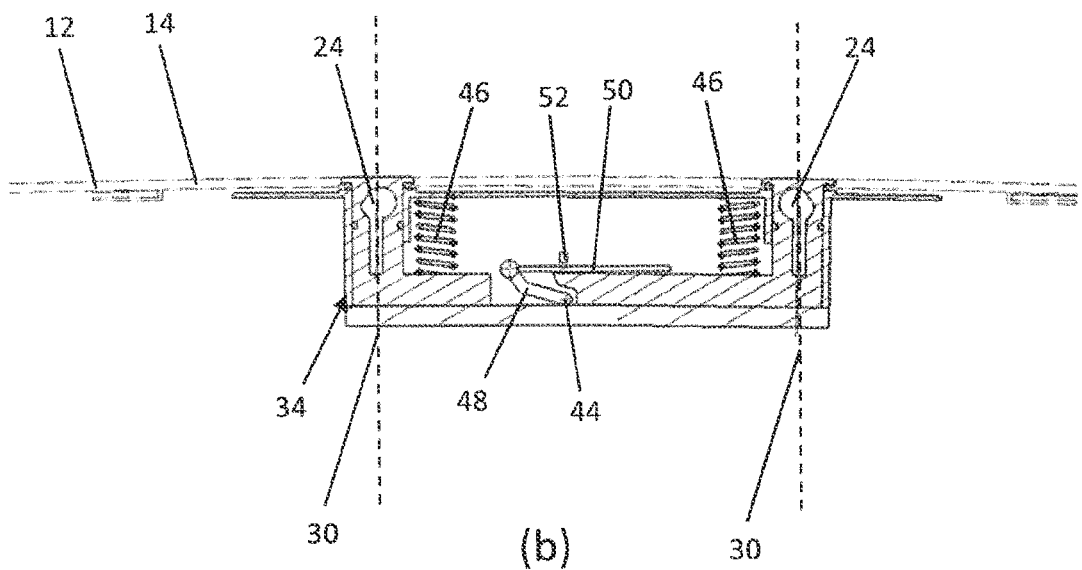
Figure 3:
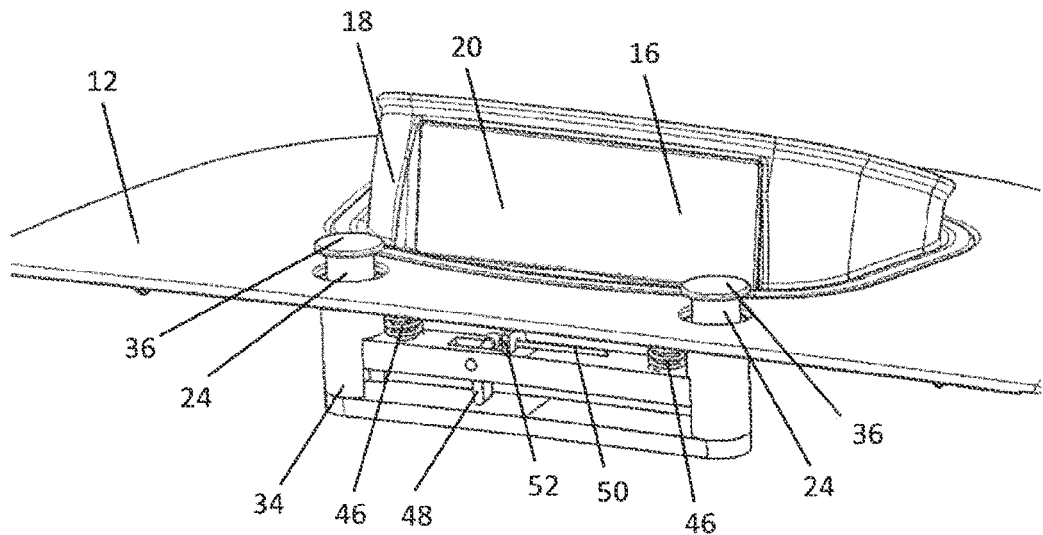
FIG. 3 shows an illustrative configuration of the roof module according to the invention in a schematic view (a) and in a sectional view (b) with the cleaning nozzles in a deployed position.
Figure 3:
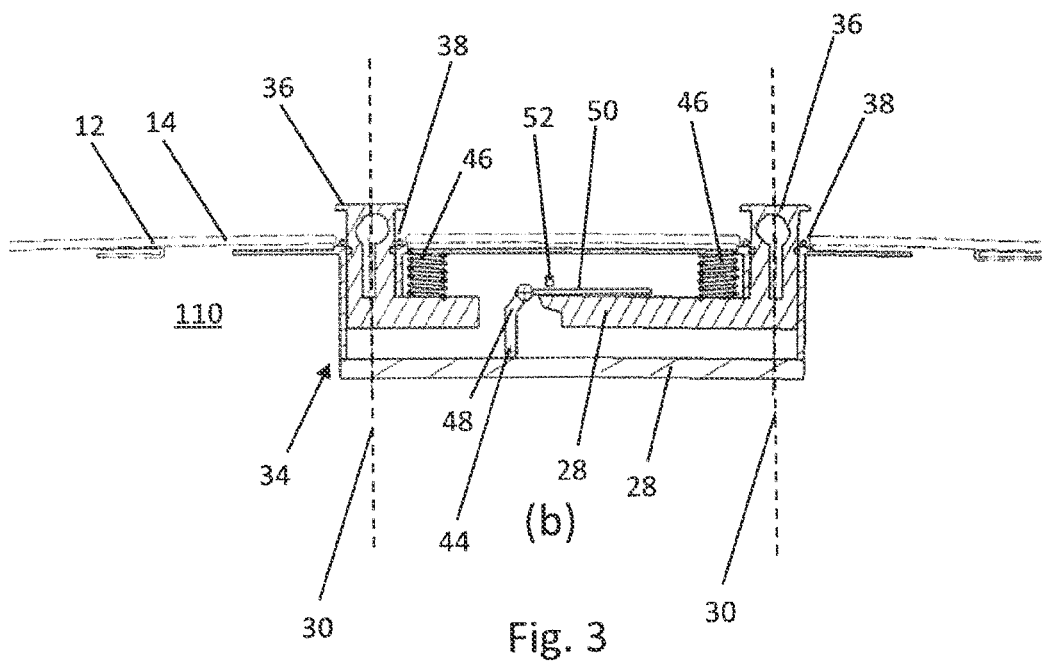

The movability between the retracted position and the deployed position is provided by means of a drive kinematics unit 34. Drive kinematics unit 34 moves the at least one cleaning nozzle 24 in such a manner that at least one lid part 36 of housing 28 is flush with the outer surface of roof skin 14 of the vehicle roof (see FIG. 2(*a*)) when the at least one cleaning nozzle 24 is in the retracted position. When the least one cleaning nozzle 24 is in the deployed position, the at least one lid part 36 at least partially protrudes above the outer surface of roof skin 14 of vehicle roof 100, as can be seen in FIGS. 3(*a*) and 5 in particular. By means of the at least one lid part 36, at least one opening 38 in panel component 12, in which the at least one cleaning nozzle 24 is disposed and moveable between the retracted position and the deployed position, can be closed in an essentially precisely fitting manner. Furthermore, housing 28 also comprises at least one opening 40, through which the at least one cleaning nozzle 24 can spray fluid cone 26, which is produced during cleaning of see-through area 20, onto see-through area 20 from outside, preferably in the direction opposite to the driving direction, when the at least one cleaning nozzle 24 is in the deployed position.

Figure 5:
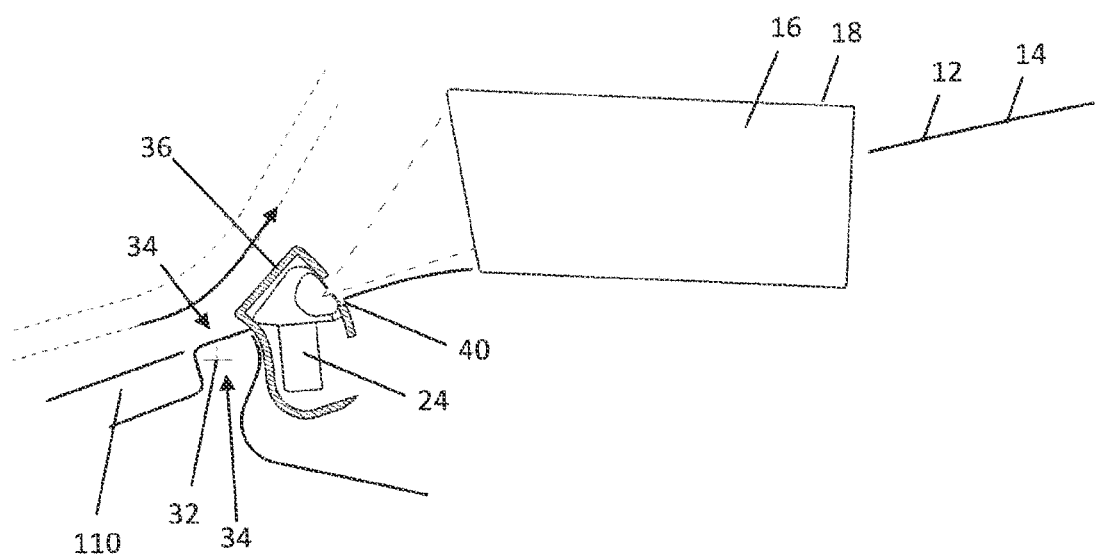
FIG. 5 shows an illustrative configuration of a housing of a cleaning nozzle in a sectional view with the cleaning nozzle in a deployed position.

At least part of housing 28 serves as a (head) wind spoiler by means of which headwind can be deflected away from see-through area 20 when the at least one cleaning nozzle 24 is in the deployed position. Such an aerodynamic shape of housing 28 is schematically illustrated in FIG. 5. At least lid part 36 of the housing is configured in such a manner that headwind (as well as ambient wind) is deflected in such a manner in the vertical direction that it no longer strikes see-through area 20. This enables a more effective cleaning of see-through area 20 since the cleaning process is no longer affected by headwind or ambient wind which could blow the cleaning fluid away, for example. Alternatively or additionally, it is also possible, for example, for one or more side walls of housing 28 to be shaped in such a manner that the headwind (as well as an ambient wind) can be led past see-through area 20 to the sides thereof (viewed in a direction orthogonal to the optical axis).

Figure 4:
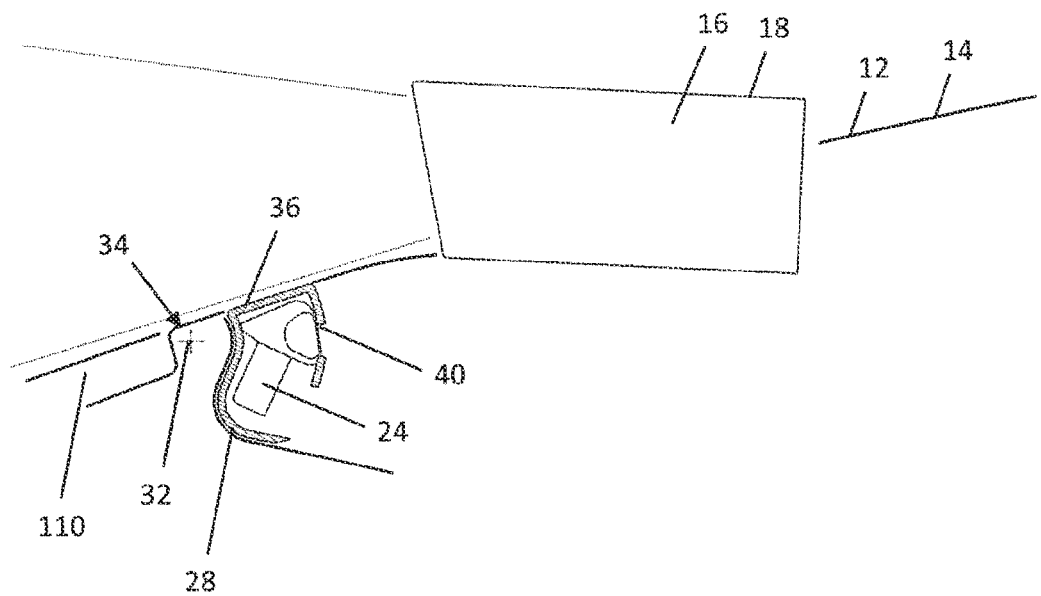
FIG. 4 shows an illustrative configuration of a housing of a cleaning nozzle in a sectional view with the cleaning nozzle in a retracted position.

Drive kinematics unit 34 comprises a drive 42, which is merely shown schematically in the figures. Drive 42 can comprise an electric motor, a Bowden cable, and/or oil hydraulics, for example. Other types of drives are conceivable as well. Drive 42 can be configured to be moved along a drive axis 44 and/or about drive axis 44, for example. In the case at hand, drive 42 is an electric motor whose drive axis 44 is the axis of rotation. Preferably, drive axis 44 is oriented in a direction other than that of axis of movement 30 and/or axis of rotation 32. In the case of FIGS. 2 and 3, drive axis 44 is oriented orthogonally to axis of movement 30. In the case of FIGS. 4 and 5, on the other hand, drive axis 44 coincides with axis of rotation 32. For deflecting the movement, drive kinematics unit 34 can preferably have a transmission comprising a gearwheel drive or the like.

In the case of FIGS. 2 and 3, drive kinematics unit 34 further comprises at least one spring 46 (two springs 46 in the case at hand), by means of which the at least one cleaning nozzle 24 can be returned from the deployed position into the retracted position by means of a restoring force of the least one spring 46. Drive 42 preloads springs 46 when deploying cleaning nozzles 24. Once see-through area 20 has been cleaned, a holding force (provided by a self-locking effect of the electric motor, for example) holding cleaning nozzles 24 in the deployed position can be released. After release, the cleaning nozzles can be moved back into the retracted position by means of the preload of springs 46 without having to provide additional drive energy for this purpose again.

In the illustrative configurations according to FIGS. 2 and 3, drive kinematics unit 34 further comprises at least one lever element 48. In the case at hand, drive kinematics unit 34 comprises a first lever element 48 and a second lever element 50, which are each connected to each other in a force-transmitting manner at one of their ends via a floating bearing. First lever element 48 is connected to drive 42 in such a manner at one of its ends that a rotation of drive 42 (i.e., the electric motor) about drive axis 44 is transmitted to the first lever element. Since first lever element 48 is connected to second lever element 50, this rotation is in turn transmitted to second lever element 50. Second lever element 50 engages a bracket 52 (see FIGS. 2(*a*) and 3(*a*)), which is fixed to a housing portion of housing 28. Second lever element 50 is guided in bracket 52 with play (i.e., in an at least translationally movable manner). As a result, a rotary movement of first lever element 48 is transmitted to bracket 52 via second lever element 50 and bracket 52 moves the housing portion along axis of movement 30 (i.e., translationally) since it is fixed thereto, thus deploying cleaning nozzles 24.

The invention claimed is:

1. A roof module for forming a vehicle roof on a motor vehicle, the roof module comprising:
  a panel component whose outer surface at least partially forms the roof skin of the vehicle roof and serves as an outer sealing surface of the roof module,
  at least one environment sensor configured to send and/or receive electromagnetic signals through a see-through area for detecting a vehicle environment around an optical axis of the environment sensor, and
  at least one cleaning nozzle configured to clean the see-through area,
  wherein, viewed in the direction in which the optical axis of the environment sensor points, the at least one cleaning nozzle is disposed in such a manner in an area of the panel component in front of the see-through area that the at least one cleaning nozzle can be moved between a retracted position and a deployed position by at least one drive kinematics unit,
  wherein the at least one drive kinematics unit comprises a drive that is configured to move the at least one cleaning nozzle from the retracted position to the deployed position at least along a travel axis and/or at least around a rotation axis,
  wherein the drive is movable along a drive axis and/or around the drive axis, the drive axis being oriented in a direction different from the travel axis and/or the rotation axis,
  wherein the at least one drive kinematics unit comprises a first lever element and a second lever element, the first lever element being held on a frame structure of the roof module by a fixed bearing,
  wherein the first lever element and the second lever element are connected to one another in a force-transmitting manner at one of their ends via a movable bearing,
  wherein a movement of the drive can be transmitted to the at least one cleaning nozzle via a rotary movement of the first lever element to a translational movement of the second lever element,
  wherein the second lever element is disposed within and guided by a bracket in a translationally movable manner, the bracket being fixed to a housing portion of at least one housing,
  wherein the translational movement of the second lever element within the bracket moves the housing portion along the travel axis to move the at least one cleaning nozzle.

2. The roof module according to claim 1, wherein the at least one cleaning nozzle is disposed in the at least one housing which comprises at least one lid part.

3. The roof module according to claim 2, wherein the at least one lid part is flush with the outer surface of the roof skin of the vehicle roof when the at least one cleaning nozzle is in the retracted position, and the at least one lid part at least partially protrudes over the outer surface of the roof skin of the vehicle roof when the at least one cleaning nozzle is in the deployed position.

4. The roof module according to claim 2, wherein the at least one lid part is configured to close at least one opening in the panel component in an essentially precisely fitting manner, the at least one cleaning nozzle being disposed and adjustable between the retracted position and the deployed position in said opening.

5. The roof module according to claim 1, wherein the at least one housing comprises at least one opening through which the at least one cleaning nozzle can spray a fluid cone, which is produced when cleaning the see-through area, onto the see-through area from outside.

6. The roof module according to claim 5, wherein the at least one cleaning nozzle is oriented in such a manner when in the deployed position that the fluid cone strikes the see-through area at an oblique angle.

7. The roof module according to claim 1, wherein at least part of the at least one housing serves as a headwind spoiler configured to deflected headwind away from the see-through area when the at least one cleaning nozzle is in the deployed state.

8. The roof module according to claim 1, wherein the drive comprises an electric motor, a Bowden cable, and/or oil hydraulics.

9. The roof module according to claim 1, wherein the drive kinematics unit comprises a transmission having a gearwheel drive.

10. The roof module according to claim 1, wherein the drive kinematics unit comprises at least one spring configured to return the at least one cleaning nozzle from the deployed position into the retracted position by means of a restoring force of the at least one spring.

11. The roof module according to claim 1, wherein the at least one environment sensor is a lidar sensor and/or a radar sensor and/or a camera sensor and/or a multi-camera sensor.

12. A motor vehicle comprising a roof module according to claim 1.

13. The roof module according to claim 5, wherein the fluid cone is in the direction opposite to the driving direction.

* * * * *